US012754332B2

(12) United States Patent
Reed et al.

(10) Patent No.: US 12,754,332 B2
(45) Date of Patent: Oct. 6, 2026

(54) REAL-TIME CHANGE DETECTION MONITORING USING ISOTOPIC RATIO SIGNATURES

(71) Applicant: UT-Battelle, LLC, Oak Ridge, TN (US)

(72) Inventors: Richard Reed, Knoxville, TN (US); Eva Uribe, Snoqualmie, WA (US); Louise G. Worrall, Maryville, TN (US); Thomas J. Harrison, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 374 days.

(21) Appl. No.: 18/379,901

(22) Filed: Oct. 13, 2023

(65) Prior Publication Data

US 2024/0134073 A1 Apr. 25, 2024

Related U.S. Application Data

(60) Provisional application No. 63/416,079, filed on Oct. 14, 2022.

(51) Int. Cl.
*G01T 1/16* (2006.01)
*G01T 1/167* (2006.01)
(Continued)

(52) U.S. Cl.
CPC ................ *G01T 1/30* (2013.01); *G01T 1/167* (2013.01); *G21C 19/50* (2013.01)

(58) Field of Classification Search
CPC ........... G01T 1/02; G01T 1/023; G01T 1/026; G01T 1/16; G01T 1/1603; G01T 1/1606;
(Continued)

(56) References Cited

U.S. PATENT DOCUMENTS 3,110,555 A * 11/1963 Shaffer .................. G21C 19/50 423/249
3,395,991 A * 8/1968 Grimes ................ C01G 99/006 423/258

(Continued)

OTHER PUBLICATIONS

Richard L. Reed et al., "Real-Time Inventory Change Detection for the Protactinium Decay Inventory of the Molten Salt Breeder Reactor", Nuclear Technology, vol. 209:1, 105-114, Jan. 2023. (Year: 2023).*

(Continued)

*Primary Examiner* — Allen C. Ho
(74) *Attorney, Agent, or Firm* — WARNER NORCROSS + JUDD LLP

(57) ABSTRACT

A system and a method for the remote monitoring of an irradiated salt mass within a decay enclosure is provided. The system and the method determine a mass ratio of a first radioisotope relative to a second radioisotope, the second radioisotope having a significantly shorter half-life than the first radioisotope. In addition, the second radioisotope includes a shorter half-life than an effective half-life of the decay enclosure, and the first radioisotope includes a longer half-life than the effective half-life of the decay enclosure. The mass ratio quickly decreases outside of a target range after material diversion, while remaining below the target range for several years. As a consequence, the isotopic mass ratio presents a rapid and enduring indicator of inventory change, which is of extreme importance in detecting a diversion of the irradiated salt mass, which remains a potential proliferation target.

10 Claims, 6 Drawing Sheets

(51) Int. Cl.
*G01T 1/30* (2006.01)
*G21C 19/50* (2006.01)

(58) Field of Classification Search
CPC ........... G01T 1/167; G01T 1/169; G01T 1/18; G01T 1/185; G01T 1/20; G01T 1/2006; G01T 1/2018; G01T 1/20181; G01T 1/20182; G01T 1/20184; G01T 1/20185; G01T 1/20186; G01T 1/20187; G01T 1/20188; G01T 1/24; G01T 1/242; G01T 1/243; G01T 1/244; G01T 1/247; G01T 1/248; G01T 1/29; G01T 1/2914; G01T 1/2921; G01T 1/2928; G01T 1/2935; G01T 1/30
USPC ........................... 250/370.09; 378/98.8, 98.9
See application file for complete search history.

(56) References Cited

U.S. PATENT DOCUMENTS

| | | | | | |
|---|---|---|---|---|---|
| 3,472,633 | A * | 10/1969 | McNeese | G21C 19/50 | 376/311 |
| 3,495,975 | A * | 2/1970 | Grimes | C01G 99/003 | 75/393 |
| 3,672,846 | A * | 6/1972 | McNeese | G21C 19/48 | 75/610 |
| 3,677,719 | A * | 7/1972 | Whatley | G21C 19/48 | 976/DIG. 280 |
| 7,999,236 | B2 * | 8/2011 | McDevitt | G01T 3/08 | 378/57 |
| 8,594,268 | B2 * | 11/2013 | Shu | G21C 5/02 | 376/403 |
| 9,368,244 | B2 * | 6/2016 | Woolley | G21C 1/14 | |
| 9,880,289 | B2 * | 1/2018 | Cho | G01T 1/167 | |
| 9,880,290 | B2 * | 1/2018 | Cho | G01T 1/167 | |
| 9,983,316 | B2 * | 5/2018 | Beddow | G01T 1/167 | |
| 10,438,705 | B2 * | 10/2019 | Cheatham, III | G21C 3/54 | |
| 11,009,612 | B2 * | 5/2021 | Hattori | G01T 1/167 | |
| 11,175,415 | B2 * | 11/2021 | Jehanno | G01T 7/02 | |

OTHER PUBLICATIONS

P. N. Haubenreich and J. R. Engel, "Experience with the Molten-Salt Reactor Experiment," Nuclear Applications and Technology, 8, 2, 118 (1970).

W. L. Carter and E. L. Nicholson, "Design and Cost Study of a Fluorination-Reductive Extraction-Metal Transfer Processing Plant for the MSBR," ORNL-TM-3579, Oak Ridge National Laboratory, Oak Ridge, TN (1972); pp. 19-21.

R. C. Robertson, "Conceptual Design Study of a Single-Fluid Molten-Salt Breeder Reactor," ORNL-4541, Oak Ridge National Laboratory, Oak Ridge, TN (1971); section 8.

K. Hogue, P. Gibbs, M. Dion, and W. Poore III, "Domestic Safeguards Material Control and Accountancy Considerations for Molten Salt Reactors," ORNL/SPR/150504, Oak Ridge National Laboratory, Oak Ridge, TN (2021).

L. G. Evans, V. Henzl, A. Swift, N. Luciano, R. Reed, E. Cervi, J. Cooley, J. Creasy, B. Davies, J. S. Denton, A. Favalli, B. Grogan et al., "Safeguards Technology for Thorium Fuel Cycles: Research and Development Needs Assessment and Recommendations," ORNL/TM-2020/1866, Oak Ridge National Laboratory, Oak Ridge, TN (2021); sections 3-5.

* cited by examiner

REAL-TIME CHANGE DETECTION MONITORING USING ISOTOPIC RATIO SIGNATURES

CROSS-REFERENCE TO RELATED APPLICATIONS

This application claims the benefit of U.S. Provisional Application 63/416,079, filed Oct. 14, 2022, the disclosure of which is incorporated by reference in its entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to the real-time monitoring of an irradiated salt mass within a decay enclosure, optionally a decay tank for a molten salt reactor.

BACKGROUND OF THE INVENTION

Advanced reactors have been developed by several commercial nuclear reactor vendors and are gaining momentum toward domestic and international deployment. For example, molten salt reactors are one category of advanced reactors. Unlike conventional reactors, which use solid fuel rods and water as a coolant, molten salt reactors employ a high-temperature liquid mixture of molten salt and a fissionable material that circulate through the reactor core. Spent fuel is periodically removed from the reactor core and chemically processed to separate valuable fissile and/or fertile material from radioactive waste and byproducts. The separated fissile material and/or fertile material can be reintroduced into the reactor, while other material may be stored in a decay tank or other storage tank to allow radioactive byproducts to naturally decay over time, reducing their radioactivity before further processing or disposal.

Owing to their different fuel cycles, advanced reactors require new safeguards to timely detect for the diversion of fissile material. Safeguards are well established for conventional solid-fuel reactors, but these safeguards are not suitable for real-time monitoring of nuclear chemical processes present in several advanced reactor designs. Particularly because fuel cycles for advanced reactors undergo transient conditions, there remains a continued need for the real-time monitoring of a radioactive fuel mass. More specifically, there remains a continued need for the real-time monitoring of a fuel mass within a processing tank(s) of an advanced reactor design.

SUMMARY OF THE INVENTION

A system and a method for the remote monitoring of an irradiated salt mass within a decay enclosure is provided. The system and the method determine a mass ratio of a first radioisotope relative to a second radioisotope, the second radioisotope having a significantly shorter half-life than the first radioisotope. In addition, the second radioisotope includes a shorter half-life than an effective half-life of the decay enclosure, and the first radioisotope includes a longer half-life than the effective half-life of the decay enclosure. The mass ratio quickly decreases outside of a target range after material diversion, while remaining below the target range for several years. As a consequence, the isotopic mass ratio presents a rapid and enduring indicator of inventory change, which is of extreme importance in detecting a diversion of the irradiated salt mass, which remains a potential proliferation target.

In one embodiment, the system includes a sensing module and a processing module. The sensing module is configured to measure the mass of the first radioisotope and the second radioisotope. The mass of the first radioisotope increases linearly between batch removals from the decay enclosure, while the mass of the second radioisotopes increases logarithmically between batch removals from the decay enclosure. The processing module is communicatively coupled to the sensing module and is configured to determine a ratio signal corresponding to a ratio of the first radioisotope mass relative to the second radioisotope mass. In response to the ratio signal failing to meet a target range of signal values, the processing module generates a notification to indicate an unaccounted diversion of irradiated salts from the decay enclosure.

The difference in decay inventory dynamics of the radioisotopes with long and short half-lives compared to an effective half-life of the decay inventory means that their mass ratio creates a smaller range of nominal values, e.g., measured by the deviation from the mean, which provides a more sensitive indicator of loss than the absolute mass of either isotope would on its own. In one embodiment, the processing module monitors the mass ratio, and optionally its time derivative, of Pa-231 relative to Pa-233. In another embodiment, the processing module monitors the mass ratio, and optionally its time derivative, of other long-lived fission products relative to Pa-233.

Embodiments of the present invention are uniquely adapted to monitor for material loss from a decay inventory of irradiated salt. The present invention can provide an unobtrusive means of early detection of the misuse of nuclear material by continuously or periodically comparing a mass ratio and/or its rate of change with nominal operating parameters. The present invention can also provide real-time nuclear material accountability for emerging fuel cycles, such as protactinium decay in thorium-based nuclear reactors or fuel cycling for advanced nuclear reactors.

These and other features and advantages of the present invention will become apparent from the following description of the invention, when viewed in accordance with the accompanying drawings and appended claims.

DETAILED DESCRIPTION OF THE CURRENT EMBODIMENTS

As discussed herein, the current embodiments relate to a system and a method for the remote monitoring of an irradiated salt mass based on a mass ratio of radioisotopes. The system and method provide real-time nuclear material accountability for emerging fuel cycle needs, such as protactinium decay in thorium-based reactors or fuel cycling for advanced reactor designs.

Figure 1:
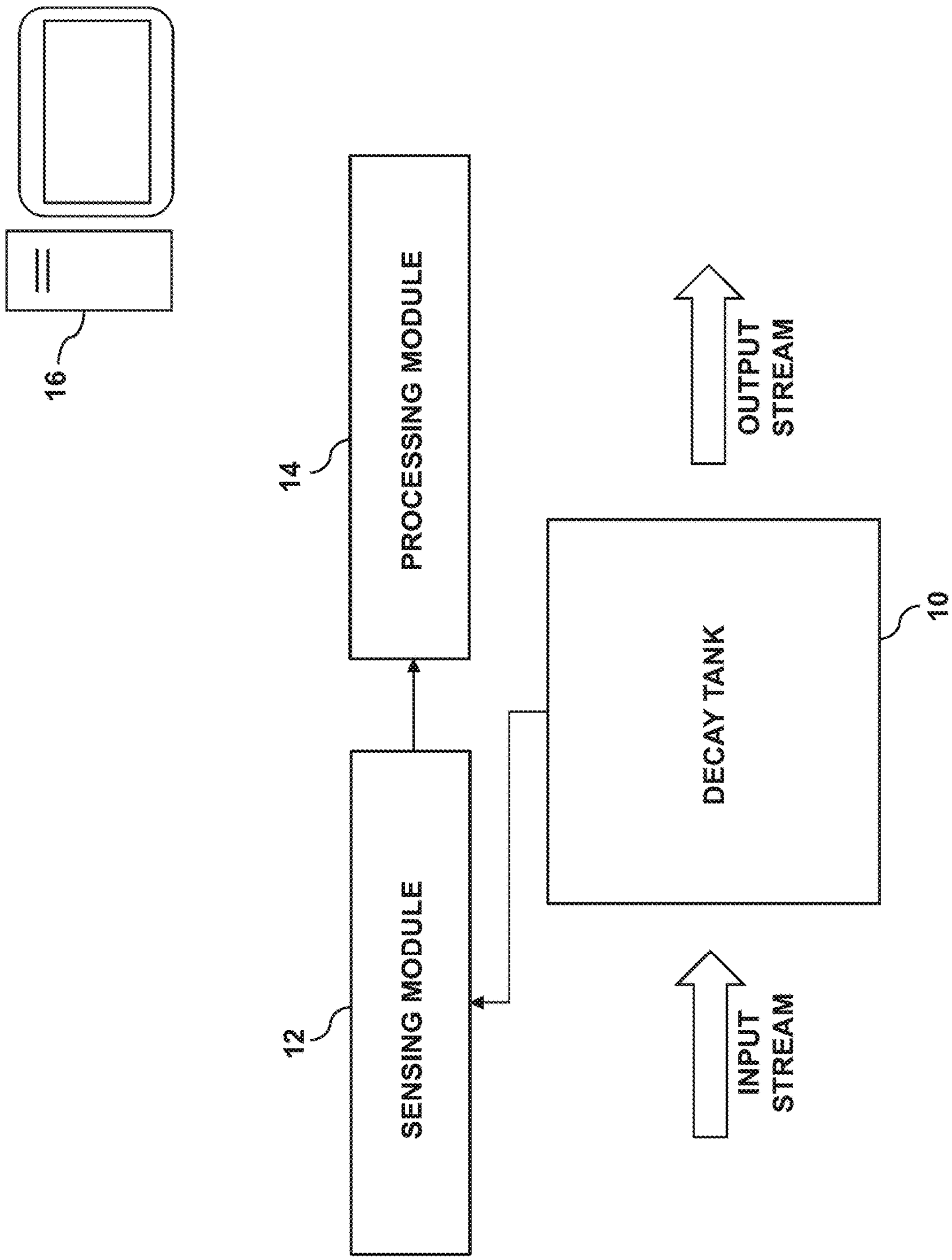
FIG. 1 is a block diagram depicting a system for the remote monitoring of an irradiated salt mass in a decay enclosure based on a mass ratio of radioisotopes.

Referring now to FIG. 1, a system for the remote monitoring of an irradiated salt mass is illustrated. The system includes a decay enclosure 10, a sensing module 12, and a processing module 14 in data communication with one or more computing devices 16, for example a personal workstation or a cloud server. The decay enclosure 10 is illustrated as a protactinium decay tank for use with a molten salt breeder reactor; however the decay enclosure 10 can be adapted for other radioisotopes and reactor designs in other embodiments as desired. The decay enclosure 10 is configured to safely house an irradiated salt mass containing radioisotopes that were produced during reactor operation to allow protactinium to decay into fissile material (uranium). In other embodiments, the decay enclosure 10 provides a space in which radioactive byproducts can naturally decay over time, particularly those byproducts having short half-lives, thereby reducing their radioactivity before further processing or disposal.

In the embodiment of FIG. 1, the input stream includes a continuous or semi-continuous homogenous mixture of fission products, uranium, and protactinium. The chemical composition of the input stream is different than in the bulk of the salt present in the reactor core, as the decay enclosure 10 is located after several chemical processing steps that are designed to selectively remove certain elements from the irradiated salt. The output stream includes a uranium hexafluoride ($UF_6$) discard, which represents the chemical process of continuously fluorinating a circulating stream of the salt in the decay enclosure 10. The output stream also includes a batch discard, which occurs periodically (e.g., every 220 days). The output stream optionally includes a periodic sampling discard, which can include for example the extraction of small samples for chemical testing.

Figure 2:
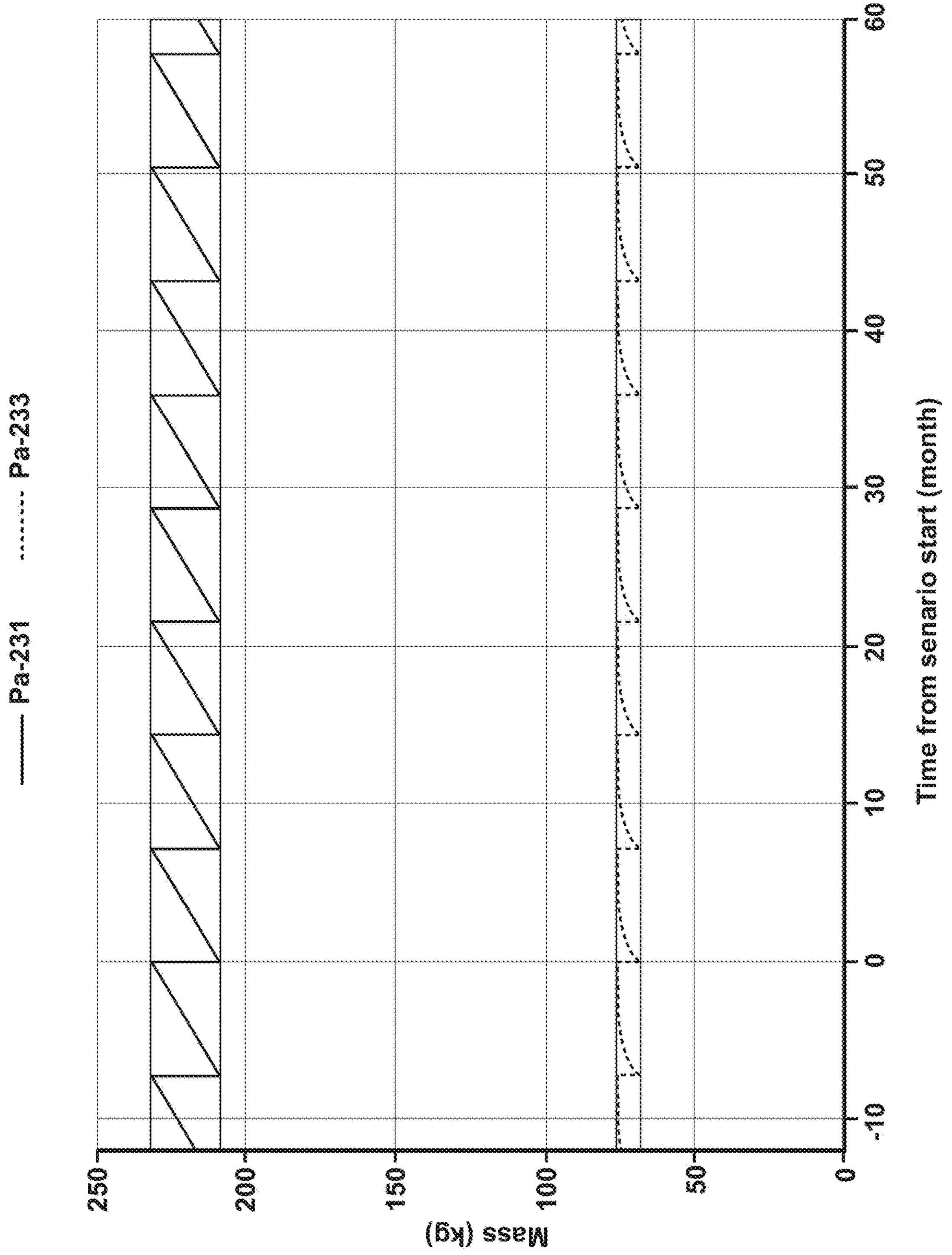
FIG. 2 is a graph illustrating irradiated salt mass inventory in a decay enclosure, including Pa-231 and Pa-233.

The irradiated salt mass in the input stream includes at least two radioisotopes, a long-lived isotope and a short-lived isotope. For example, the protactinium present in the decay enclosure 10 includes each of Pa-231 and Pa-233. The half-life of Pa-231 is 32,760 years, while the half-life of Pa-233 is 26.97 days. FIG. 2 models the mass of each isotope of protactinium in the decay enclosure 10 during normal operation (i.e., quasi-steady state), that is, after the decay enclosure is filled. The mass in the decay enclosure 10 experiences periodic fluctuations, which are driven by the batch discards (220 days in this example). The long-lived isotope (Pa-231) experiences a linear growth in mass between batch discards, while the short-lived isotope (Pa-233) experiences a logarithmic growth in mass between batch discards. This growth in mass for each isotope is attributed to the continuous input stream containing each of the foregoing isotopes of protactinium. The mass of each isotope is able to diminish in two ways: batch discards and radioactive decay. The batch discards occur periodically, represented by the sudden drop in isotopic mass at the end of each discard interval. Between discards, the radioactive decay of each isotope of protactinium is less than the rate of input, resulting in a mass increase (linear for Pa-231 and logarithmic for Pa-233) between discards.

The system and method of the present invention rely on the determination of an effective half-life of the irradiated salt mass in the decay enclosure. The effective half-life of the irradiated salt mass is determined by equations (1) and (2) below. As shown in equation (1), $\lambda_{eff}$ represents the effective decay constant, and f represents the fraction of the tank discarded every $\Delta t$ days. Using this effective decay constant, the effective half-life is computed with equation (2):

$$\lambda_{eff} = \frac{\ln(1-f)}{\Delta t} \tag{1}$$

$$T_{1/2,eff} = \frac{\ln(2)}{\lambda_{eff}} \tag{2}$$

Figure 3:
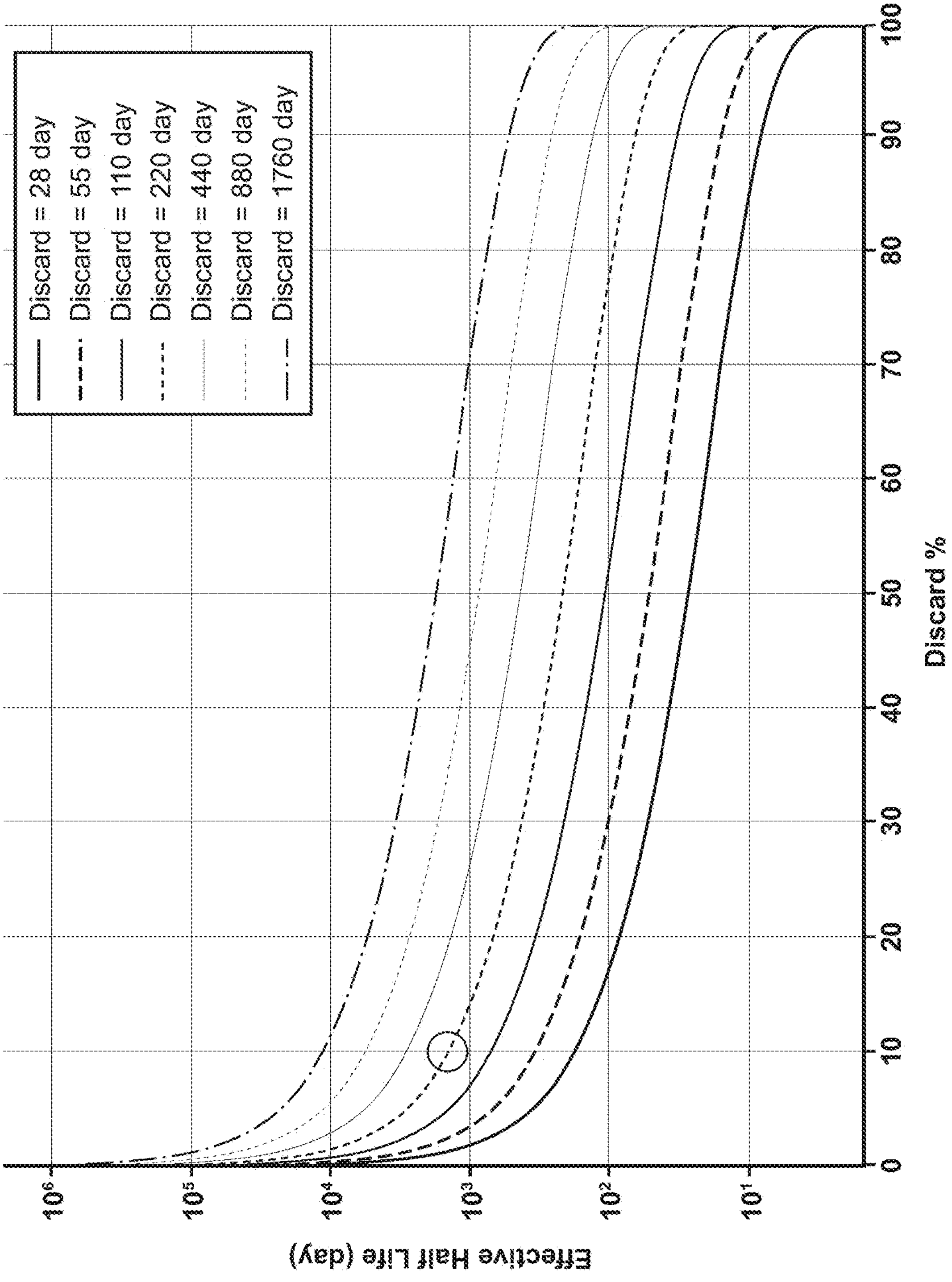
FIG. 3 is a graph illustrating the effective half-life of an irradiated salt mass within a decay enclosure based on a discard fraction and a discard interval.

Stated somewhat differently, the effective half-life is solely a function of the fraction f of the total mass that is removed from decay enclosure (i.e., the discard fraction) over a repeating time interval $\Delta t$ (i.e., the discard interval). FIG. 3 further illustrates the relationship between the effective half-life of the decay enclosure $T_{1/2,eff}$, the discard fraction f, and the discard interval $\Delta t$. E.g., for a discard fraction of 10% and a discard interval of 220 days, the effective half-life is 1,447 days.

Eligible long-lived isotopes have a half-life that is greater than the effective half-life $T_{1/2,eff}$, and eligible short-lived isotopes have a half-life that is less than the effective half-life $T_{1/2,eff}$. For example, the long-lived isotope can have a half-life that is two-times to two-thousand-times greater than the effective half life $T_{1/2,eff}$. Similarly, the short-lived isotope can have a half-life that is two-times to two-thousand-times less than the effective half life $T_{1/2,eff}$. In this respect, batch discard is the dominant mechanism for removal of the long-lived isotope (e.g., Pa-231) from the decay enclosure. Conversely, radioactive decay is the dominant mechanism for removal of the short-lived isotope (e.g., Pa-233) from the decay enclosure.

As noted above, the mass of each radioisotope is determined by the sensing module 12. The sensing module 12 can include any sensor or sensors that are configured to directly or indirectly determine the mass of the radioisotopes, including for example non-destructive or destructive assay techniques. For example, the sensing module 12 can incorporate gamma-ray spectroscopy to measure the relative concentration of each radioisotope in the irradiated salt mass, and thereby determine the isotopic mass of each radioisotope. The sensing module 12 is in turn communicatively coupled to the processing module 14, which is configured to determine a mass ratio of the long-lived radioisotope (Pa-231) relative to the short-lived radioisotope (Pa-233). The processing module 14 then compares the isotopic ratio to a target range, the target range being determined by the processing module 14. As explained below, the mass ratio quickly decreases outside of the target range after a material loss, while potentially remaining below the target range for several years. As a consequence, the mass ratio presents a rapid and enduring indicator of inventory change, which is of extreme importance in detecting diversion of the irradiated salt mass, which remains a potential proliferation target.

Figure 4:
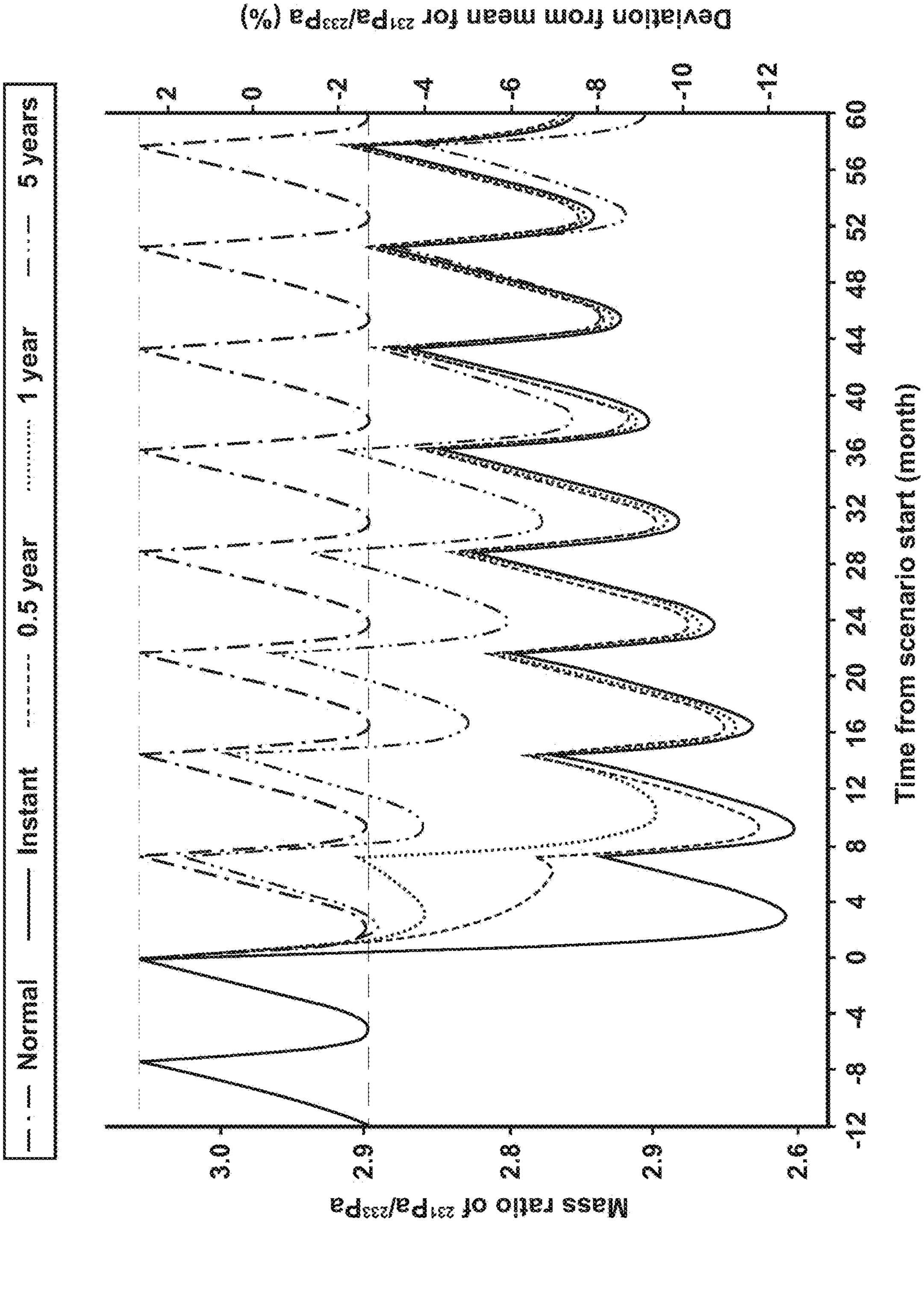
FIG. 4 is a graph illustrating the mass ratio of Pa-231 to Pa-233 in the decay inventory during material loss scenarios.

The difference in decay inventory dynamics of the isotopes with long and short radioactive half-lives compared to the effective half-life of the decay inventory means that their mass ratio creates a smaller range of nominal values, e.g., measured by the deviation from the mean, which provides a more sensitive indicator of loss than the absolute mass of either isotope would on its own. In the embodiment illustrated in FIG. 4, for example, the mass ratio of Pa-231 to Pa-233 increased from 2.90 to 3.02 during each discard cycle, with a mean of 2.96. The shaded region is the range of values at stead state (i.e., t<0). The removal of irradiated salt containing 8 kg of uranium and protactinium from the decay enclosure was modeled over four scenarios beginning at month zero: instantaneously, over six months, over one year, and over five years. In each scenario, the diversion of irradiated salt is immediately apparent in the deviation of the mass ratio from the established nominal range. Not surprisingly, the instantaneous removal of 8 kg of fissile or protofissile material from the decay enclosure represents the biggest departure from the nominal range, however the gradual removal was still discernable.

Figure 5:
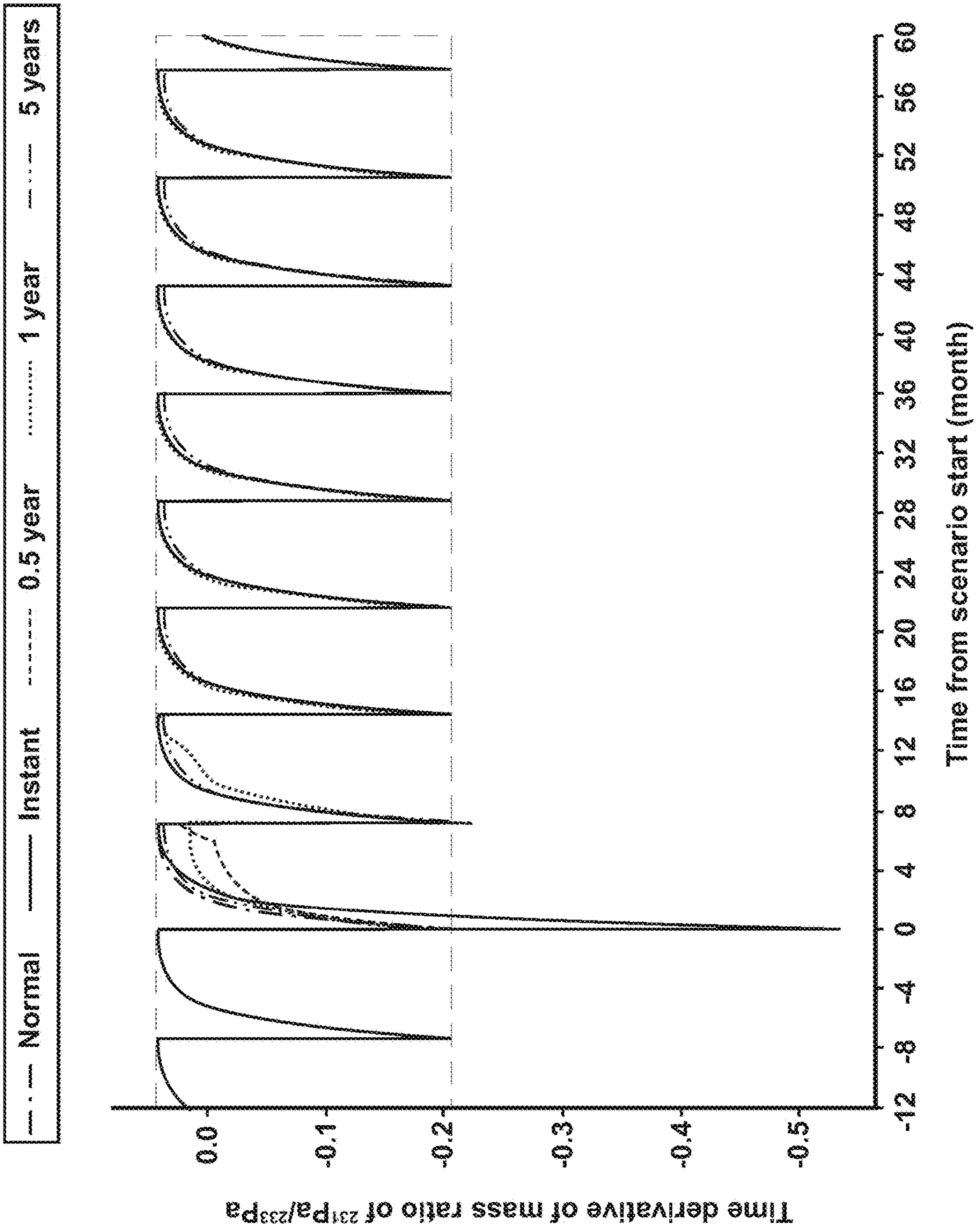
FIG. 5 is a graph illustrating the time rate of change of the mass ratio of Pa-231 to Pa-233 in the decay inventory during material loss scenarios.

In some embodiments, the processing module 14 is further operable to determine a time derivative of the mass ratio for early detection of a diversion of irradiated salt from the decay enclosure 10. The time derivative of the isotopic mass ratio of Pa-231 to Pa-233 is plotted in FIG. 5. As in the example of FIG. 4, the removal of 8 kg of irradiated salt from the decay enclosure instantaneously, over six months, over one year, and over five years is depicted. The shaded region depicts the range of values at stead state (i.e., t<0). Because the increase in the mass of Pa-231 is approximately linear, the time derivative of Pa-231 to Pa-233 results in a scaled exponential behavior, which is particularly evident in the case of instantaneous diversion of irradiated salt. Regardless of scenario, the time derivative remained relatively consistent. In practice, the time derivative of the mass ratio can be used to verify the time since the last discard, which can be used to supplement discard data stored in operational logs.

Notably, the present invention is not limited to isotopes of the same element. For example, other embodiments can monitor isotopes of dissimilar elements, provided that the first radioisotope has a half-life that is much longer than the effective half-life of the decay enclosure, and provided that the second radioisotope has a half-life that is much shorter than the effective half-life of the decay enclosure. Suitable alternatives include, for example, an isotopic ratio of Pu-239 (24,000 years) to Pa-233 (27 days). The monitoring of an isotopic ratio over time, and/or or the time rate of change of an isotopic ratio, provides a sensitive and lasting indicator of material diversion, provided that the first radioisotope has a half-life that is much longer than the effective half-life of the decay enclosure, and provided that the second radioisotope has a half-life that is much shorter than the effective half-life of the decay enclosure.

Figure 6:
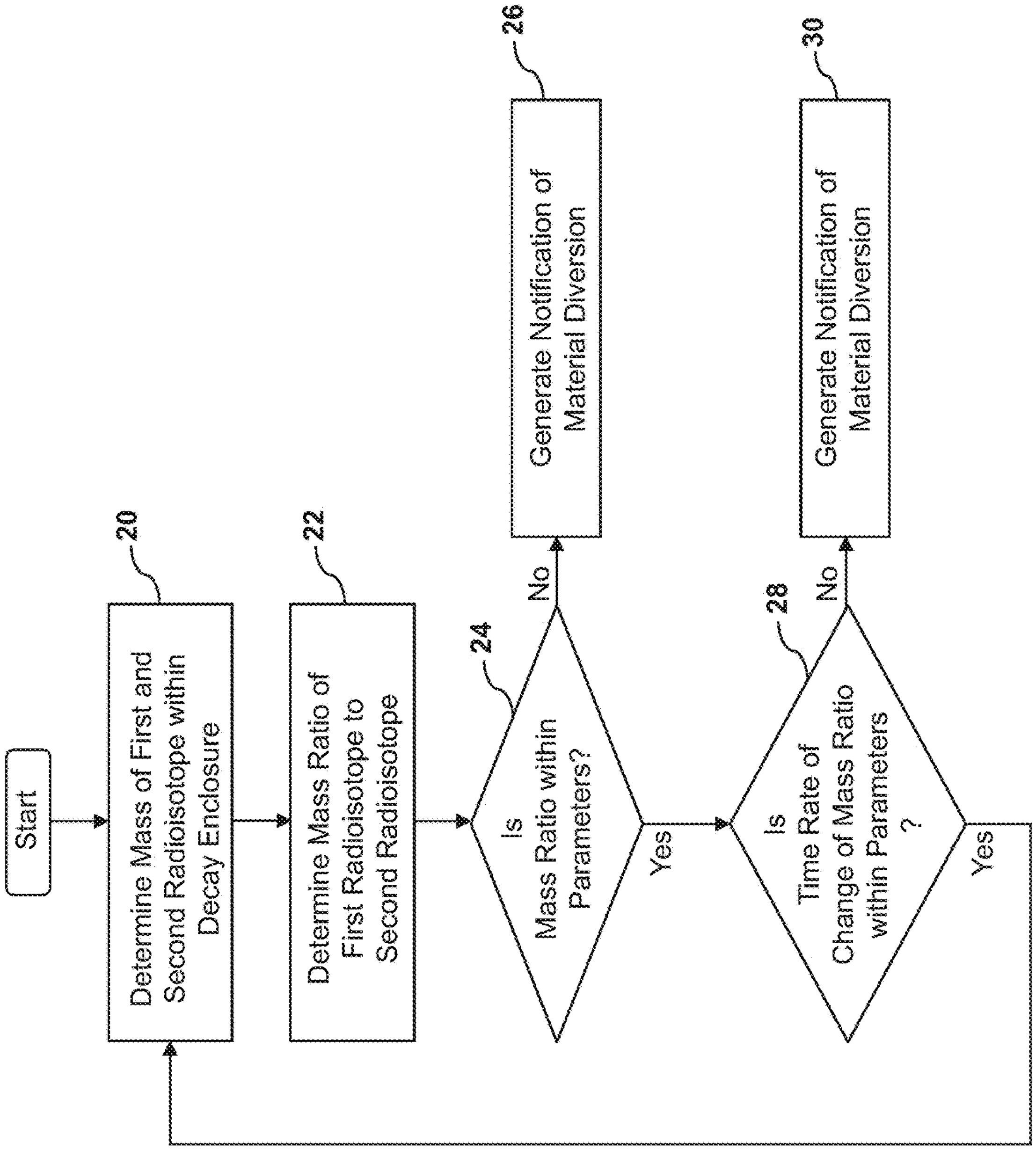
FIG. 6 is a flow-diagram illustrating a method for the remote monitoring of an irradiated salt mass in a decay enclosure based on a mass ratio of radioisotopes.

Referring now to FIG. 6, a flow chart illustrating a method of operation for the isotopic ratio-based monitoring system will now be described. At step 20, the sensing module 12 determines the mass of each of the first and second radioisotopes within the decay enclosure 10. The first radioisotope is selected such that it possesses a half-life that is much longer than the effective half-life of the decay enclosure, and the second radioisotope is selected such that it possesses a half-life that is much shorter than the effective half-life of the decay enclosure. The effective half-life of the decay enclosure is a function of the discard fraction f, and the discard interval Δt, which are dictated by system parameters for the associated fuel cycle or reactor design.

At step 22, the processing module 14 (or optionally the sensing module 12) determines the mass ratio of the first radioisotope relative to the second radioisotope. The processing module 14 can be implemented as a microprocessor, an FPGA, or an ASIC, by non-limiting example, and is communicatively coupled to each of the sensing module 12 and to the computing device 16. At decision step 24, the processing module 14 determines if the mass ratio is within nominal parameters. This step can include determining if the mass ratio is between predetermined upper and lower limits. Alternatively, this step can include determining if the mass ratio is below and/or above a predetermined lower threshold and/or upper threshold. If the mass ratio is determined to be outside of nominal parameters, the processing module 14 can cause a notification to be sent to the computing device 16 to indicate a possible diversion of irradiated salt mass at step 26. If however the mass ratio is determined to be within nominal parameters, the method can proceed to step 28 and determine if the time derivative of the mass ratio is within nominal parameters. The time derivative of the mass ratio is primarily used to verify the time since the last discard, particularly because the time derivative remains relatively consistent for each cycle. As optionally shown in FIG. 6, the time derivative can also be used to detect a material diversion. For example, if the time derivative of the mass ratio is determined to be outside of nominal parameters, the processing module 14 can cause a notification to be sent to the computing device 16 at step 30 to indicate a possible diversion of irradiated salt mass. The foregoing method steps are then continuously repeated to detect a material diversion at step 20.

To reiterate, the present invention is uniquely adapted to monitor for material loss from a decay inventory of irradiated salt. The present invention can provide an unobtrusive means of early detection of the misuse of nuclear material by continuously comparing a mass ratio and/or its rate of change with nominal operating parameters. The present invention can also provide real-time nuclear material accountability for emerging fuel cycles, such as protactinium decay in thorium-based nuclear reactors or fuel cycling for advanced nuclear reactors.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A processing module configured to monitor a mass ratio of a first radioisotope relative to a second radioisotope, the first radioisotope and the second radioisotope being present in an irradiated salt mass within a decay enclosure having an input stream and an output stream, the input stream including an inflow of irradiated salts, the output stream including periodic batch removals characterized by a discard fraction and a discard interval, the discard fraction being a fraction of the irradiated salts removed from the decay enclosure at a conclusion of each decay interval, the processing module including instructions in a machine readable memory that, when executed, cause the processing module to perform the following method steps:

determine a ratio signal corresponding to a mass ratio of the first radioisotope relative to the second radioisotope, the first radioisotope having a half-life that is greater than an effective half-life of the irradiated salt mass within the decay enclosure, the second radioisotope having a half-life that is less than the effective half-life of the irradiated salt mass within the decay enclosure, wherein the effective half-life is a function of the discard fraction and the discard interval;

compare the ratio signal to a target range of signal values; and in response to the ratio signal failing to meet the target range of signal values, causing a transmission of a notification, the notification indicating an unaccounted removal of the irradiated salts from the decay enclosure.

2. The processing module of claim 1, wherein the method steps performed by the processing module further include establishing the target range of signal values from values of the ratio signal received over a predetermined time interval.

3. The processing module of claim 1, wherein the method steps performed by the processing module further include:

producing a derivative of the ratio signal over a predetermined time interval indicative of the effective half-life; and establishing the target range of signal values from a combination of values of the ratio signal received over the predetermined time interval and values of the derivative of the ratio signal.

4. The processing module of claim 1, wherein:

a mass of the first radioisotope undergoes a linear growth within the decay enclosure after each batch removal; and a mass of the second radioisotope undergoes a logarithmic growth within the decay enclosure after each batch removal.

5. The processing module of claim 1, wherein:

the half-life of the first radioisotope is at least ten times greater than the effective half-life; and the half-life of the second radioisotope is at least ten times less than the effective half-life.

6. The processing module of claim 1, wherein the first radioisotope is Pa-231, and wherein the second radioisotope is Pa-233.

7. The processing module of claim 1, wherein:

the discard fraction is 0.1;

the discard interval is 220 days; and the effective half-life is 1447 days.

8. The processing module of claim 1, wherein the determining the ratio signal includes determining the ratio signal in real time.

9. The processing module of claim 1, wherein the processing module is communicatively coupled to a sensing module for measuring a mass of each of the first radioisotope and the second radioisotope.

10. The processing module of claim 1, wherein the decay enclosure is a decay tank of a molten salt breeder reactor.

* * * * *